(12) United States Patent
Majkrzak

(10) Patent No.: US 7,780,102 B2
(45) Date of Patent: Aug. 24, 2010

(54) FEED ROLLER DRIVE FOR WOOD CHIPPER

(75) Inventor: David S. Majkrzak, West Fargo, ND (US)

(73) Assignee: Crary Industries, Inc., West Fargo, ND (US)

(*) Notice: Subject to any disclaimer, the term of this patent is extended or adjusted under 35 U.S.C. 154(b) by 462 days.

(21) Appl. No.: 11/728,999

(22) Filed: Mar. 28, 2007

(65) Prior Publication Data
US 2008/0237377 A1 Oct. 2, 2008

(51) Int. Cl.
*B02C 17/02* (2006.01)
*B07B 13/00* (2006.01)

(52) U.S. Cl. .......... 241/92; 241/278.1; 144/162.1; 144/176; 144/218

(58) Field of Classification Search .......... 241/92, 241/278.1; 144/162.1, 172–174, 176, 218
See application file for complete search history.

(56) References Cited

U.S. PATENT DOCUMENTS

| | | | | |
|---|---|---|---|---|
| 3,373,782 A * | 3/1968 | Pease | | 144/375 |
| 3,524,485 A | 8/1970 | Smith | | 144/176 |
| 3,861,602 A * | 1/1975 | Smith | | 241/92 |
| 3,937,016 A * | 2/1976 | Stan et al. | | 60/325 |
| 4,239,070 A | 12/1980 | Burns | | 144/193 |
| 4,598,745 A * | 7/1986 | Parviainen | | 144/174 |
| 4,649,706 A * | 3/1987 | Hutson | | 60/420 |
| 4,793,561 A | 12/1988 | Burda | | 241/36 |
| 4,896,491 A | 1/1990 | Warnsholz et al. | | 56/28 |
| 4,961,539 A * | 10/1990 | Deem | | 241/36 |
| 5,020,579 A * | 6/1991 | Strong | | 144/176 |
| 5,088,532 A * | 2/1992 | Eggers et al. | | 144/356 |
| 5,205,496 A * | 4/1993 | O'Donnell et al. | | 241/34 |
| 5,230,475 A | 7/1993 | Gerner | | 241/34 |
| 5,988,539 A | 11/1999 | Morey | | 241/34 |
| 6,016,979 A | 1/2000 | Squires et al. | | 241/35 |
| 6,086,001 A | 7/2000 | Patterson | | 241/27 |
| 6,138,932 A | 10/2000 | Moore | | 241/92 |
| 6,293,479 B1 | 9/2001 | Kaczmarski et al. | | 241/92 |
| 6,427,735 B1 | 8/2002 | Brazell et al. | | 144/329 |
| 6,446,889 B1 | 9/2002 | Moore | | 241/92 |
| 6,814,320 B1 | 11/2004 | Morey et al. | | 241/34 |

(Continued)

OTHER PUBLICATIONS

Echo "Bear-Car Brochure" for 6" Chippers, 2 pgs. Published at least by Dec. 31, 2006.

(Continued)

*Primary Examiner*—Bena Miller
(74) *Attorney, Agent, or Firm*—Wood, Phillips, Katz, Clark & Mortimer

(57) ABSTRACT

The present disclosure relates to a wood chipper that has a feed roller driven by a hydraulic motor. Hydraulic fluid under pressure is provided to the motor through a two-stage pump, providing separate flows of fluid under pressure. The flows of the pump stages are combined for normal operation of the chipper. A bypass that will bypass the flow from one pump stage when the pressure of the fluid under pressure driving the motor exceeds a pre-selected level from increased load on the feed roller is provided. When the bypass is open the feed roller is slowed to reduce the feed rate of material into the chipper, and when the feed roller loads reduce, the flows will again be combined to speed up the feed roller.

13 Claims, 2 Drawing Sheets

U.S. PATENT DOCUMENTS

| | | | |
|---|---|---|---|
| 6,830,204 B1 | 12/2004 | Morey | 241/34 |
| 7,011,258 B2 | 3/2006 | O'Halloran et al. | 241/28 |
| 7,040,558 B2 | 5/2006 | Stelter et al. | 241/28 |
| 7,044,409 B2 | 5/2006 | Stelter et al. | 241/28 |
| 7,077,345 B2 | 7/2006 | Byram et al. | 241/35 |
| 2003/0141394 A1* | 7/2003 | Ueda et al. | 241/73 |
| 2007/0108323 A1* | 5/2007 | Chapman et al. | 241/30 |

OTHER PUBLICATIONS

Haldex Two Stage High/Low Hydraulic Gear Pumps—1 pg., Published Mar. 1999.

* cited by examiner

FEED ROLLER DRIVE FOR WOOD CHIPPER

BACKGROUND OF THE INVENTION

The present disclosure relates to a wood chipper and/or shredder that will accept brush, branches, logs and the like, and which has an in-feed control for decreasing the material in-feed speed automatically in response to pressure on an inlet line for a hydraulic drive motor for the feed roller.

In the prior art, various wood and brush chippers have been advanced, and a number of them have controls that sense a reduction in speed of a drive engine, for example, by obtaining a signal to stop and/or reverse the feed roller. Complete stopping of the roller, in many cases, makes restarting the system more difficult, while a reduction in the in feed speed will permit the chipper drive motor and rotor to regain momentum and continue the chipping operation.

U.S. Pat. No. 3,524,485 is typical of the type of device that will disable operation of the feed roller in accordance with changes in the speed of movement of the power unit driving the chipper.

Pressure to a hydraulic drive feed motor is sensed in U.S. Pat. No. 5,020,579, and when the pressure driving the feed roller gets too high, the device operates a ram to lift a feed rail to stop the feeding.

U.S. Pat. No. 7,011,258 also senses pressure to a drive motor for in-feed rollers, and will momentarily reverse the feed rollers and then cause them to drive forwardly in a cycle for the feeding correction.

SUMMARY OF THE INVENTION

The embodiment of a chipper disclosed in this application has a material feed roller that is driven with a hydraulic motor. The hydraulic fluid under pressure for the motor is supplied by a two-stage pump of existing design, or the supply can be two separate pumps, where the flows are combined together to drive the hydraulic motor for the feed roller during normal operation. The pump stages or separate pumps are of different flow rates, for example, a lower flow rate and a higher flow rate. A pressure sensor is utilized in the inlet line to the hydraulic motor for the feed roller, and when the pressure in the inlet line rises to a selected level (which is substantially below the maximum system pressure that can be provided by the pump or pumps) a bypass valve will open and the flow from the higher flow rate pump stage will be diverted to the fluid reservoir or tank line. The only flow provided to the motor for the feed roller is then the flow from the low flow pump stage, to thereby reduce the speed of rotation of the motor for the feed roller.

By way of example only, an existing two-stage high/low hydraulic pump can be provided wherein one stage will, at its nominal input rpm, provide a flow of four gallons per minute, and the lower flow pump stage provides a flow of two gallons per minute. When combined, the output flow would thus be a maximum of six gallons per minute provided to the hydraulic motor for the chipper feed roller. When the pressure in the input line to the hydraulic motor for the feed roller exceeds a selected, adjustable level, which may be approximately ¼ of the maximum hydraulic system pressure, the bypass valve opens and the flow from the four gallon per minute pump stage will be diverted to the input line for both pump stages, or could be diverted to the reservoir or tank so that the total hydraulic fluid flow to the motor for the feed roller is then two gallons per minute. The feed roller drive is slowed to approximately ⅓ of its maximum rotational speed.

Automatically reducing the rotational speed of the feed roller substantially before the feed roller is jammed and stopped, means that the drive to the chipper rotor has an opportunity to recover and the chipping will, in general, continue without the need for stopping and reversing the feed roller drive. The speed of the feed roller will automatically increase when the load on the feed roller reduces.

The control of the feed roller and operation of the chipper thus is based on sensing the load on the feed roller drive, in this case hydraulic pressure, and reducing the speed at which the drive for the feed roller will rotate the feed roller to a level that is less than half of the normal operating feeding speed. A slower but continuous drive to the feed roller is maintained. Then, if the load becomes lighter on the feed roller because smaller materials or smaller amounts of material are fed, the drive to the feed roller speeds up automatically to further increase throughput.

The example given above is at full flow of both pump stages. The hydraulic circuit also has a conventional manual bypass flow control to permit the operator to manually control the feed roller speed. This manual control will permit the operator to reduce the maximum speed of the feed roller, to suit general feeding conditions. If the manual bypass flow control is set so a total of four gallons per minute is provided to the feed roller motor, the automatic bypass would still operate if the pressure in the motor input line exceeds the selected level, and the flow from the higher output pump stage would be diverted. Only the flow from the lower flow pump stage would be provided through the manual flow control, or in other words, the flow to the feed roller motor would still be reduced to two gallons per minute.

DETAILED DESCRIPTION OF ILLUSTRATIVE EMBODIMENTS

Figure 1:
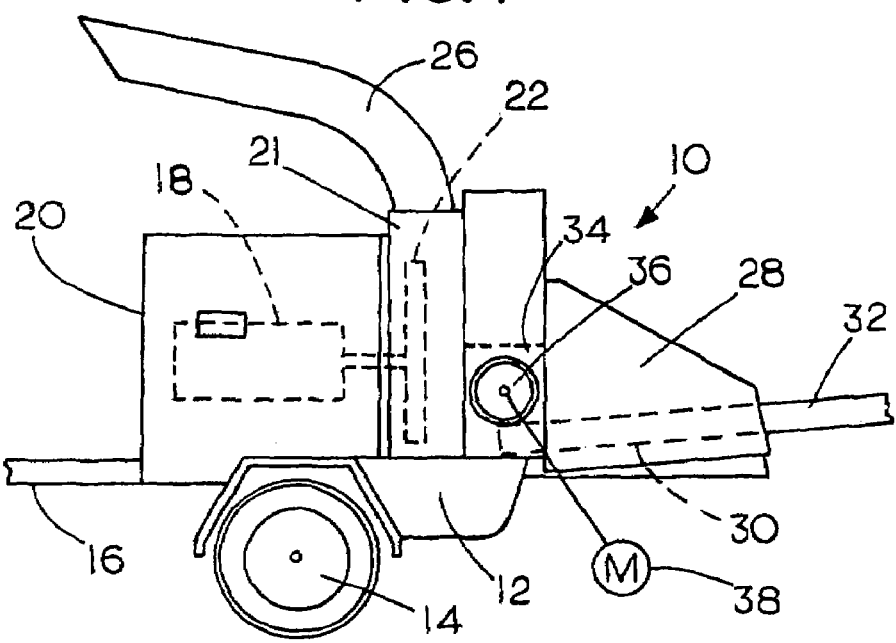
FIG. 1 is a schematic side view of a typical wood chipper utilizing a hydraulic drive for the feed roller in accordance with the present disclosure.

FIG. 1 shows a schematic illustration of a wood chipper at 10, which is a towable unit having a frame 12, wheels 14 and a hitch pole 16. The wood chipper 10 includes an engine shown in dotted lines at 18, in an engine housing 20. The engine 18 is used to drive a chipper rotor or material disintegrating member, showed in dotted lines at 22, inside a housing 24. The engine would drive the rotor or disintegrating member 22 about a central axis, through suitable belt drives, gears or the like, and wood that was fed into the rotor 22 would be chipped and exhausted out through a chute 26 in a desired direction or location. The chipper 10 has an in-feed trough 28 that has a platform or bottom 30, on which logs, branches or brush indicated at 32 can be placed. The ends of the logs or brush are then introduced into a feed chamber 34 in which a feed roller 36 is mounted, as shown schematically in FIG. 1. The feed roller 36 is movable vertically against a spring load and is driven by a hydraulic motor 38, and as the feed roller rotates it will lift to engage and move the wood or brush 32 in toward the rotating rotor 22 for chipping, shredding or disintegrating. The engine 18 also drives a hydraulic pump to provide hydraulic fluid under pressure for the motor 38.

The feed roller 36 drives the wood, brush or other material into the rotor, and as the load on the feed roller increases, the pressure that is needed on the input line of the motor 38 will increase.

Figure 2:
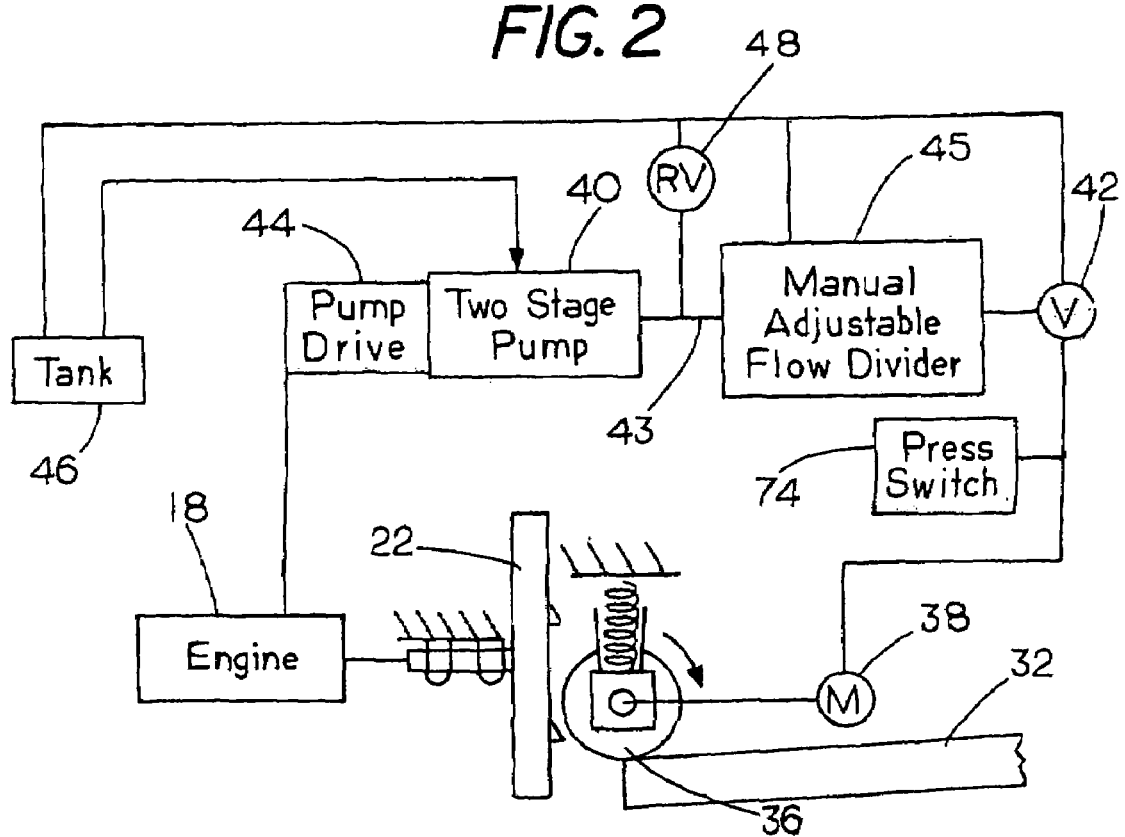
FIG. 2 is a schematic representation of the chipper rotor, feed roller, and a basic hydraulic arrangement for the drive.

FIG. 2 is a schematic showing of the system, including the rotor 22 being driven by the engine 18, and also shows the feed roller 36, and the feed roller hydraulic motor 38. The material being fed into the chipper, indicated at 32, is being driven by the feed roller 36 toward the chipper rotor. The motor 38 is powered by a two-stage pump, or alternately by two pumps, indicated at 40, operating through a manually controllable reversing valve 42 to direct flow to the motor 38. The engine 18 drives the two-stage pump 40 through a pump drive 44, which may be a belt drive, which allows changing the drive pulleys to provide different drive speeds for the pump, and hydraulic oil (also called hydraulic fluid) from a reservoir or tank 46 is provided to the pump 40. A main system relief valve 48 is provided in an input line 43 to the valve 42 and sets the system pressure at a high value, for example 3000 psi.

Also a manually adjustable, pressure compensated flow control valve 45 is connected in the line 43 on the inlet side of the valve 42. The manually adjustable, pressure compensated flow control valve 45 will permit diverting a portion of the flow in line 43 to the reservoir or tank to control the speed of motor 38 and feed roller 36. The operator can select the operating speed of feed roller 36 to meet expected feeding conditions, if a slower than maximum feed speed is needed. Such a flow control valve is conventionally used on wood chippers.

The two-stage pump illustrated may be a two-stage high/low hydraulic gear pump sold by Barnes Haldex Barnes Corporation, Rockford, Ill., USA.

Figure 3:
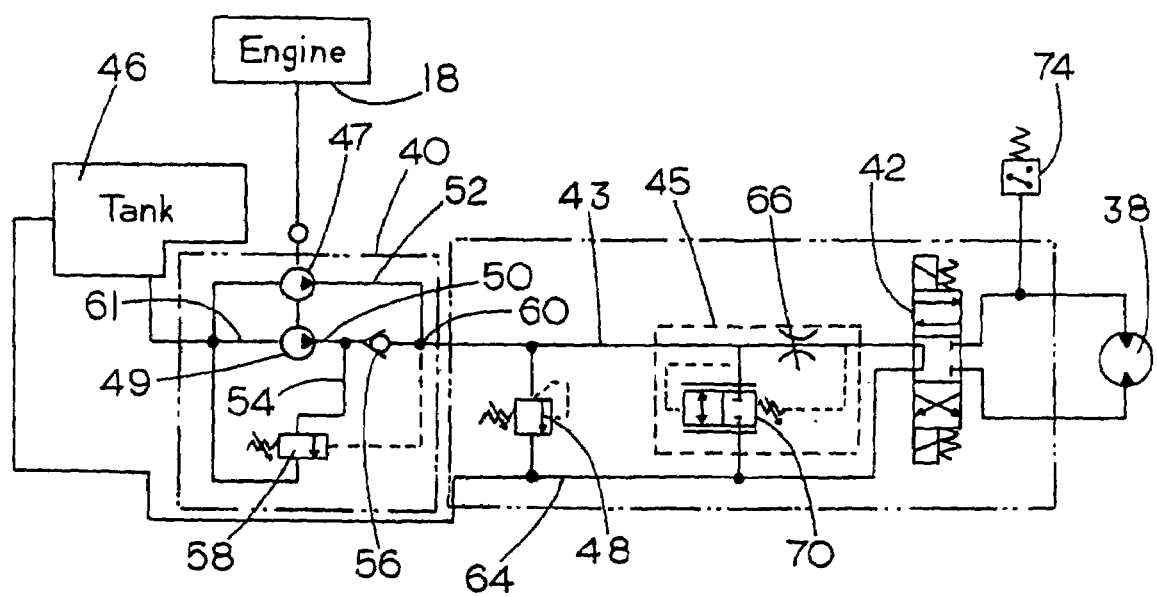
FIG. 3 is a detailed hydraulic schematic diagram of the two-stage hydraulic feed system disclosed herein.

In FIG. 3, a more detailed hydraulic schematic is illustrated.

The two-stage pump 40, as shown is driven by the engine 18, preferably by a belt drive where the drive ratio can be easily changed for different size chippers, which may require different flow rates to the feed roller motor 38. and the schematic diagram shows the passageways and components in the interior of the two-stage pump. A first pump stage or section 47, is disclosed as a low flow pump stage. For example, it would provide a flow of two gallons per minute at a rated input rpm. A second pump stage 49 is disclosed as a higher flow pump stage, and is driven at the same time as the first pump stage 47 and delivers, for example, four gallons per minute. The pump stages used can have different flows or can be the same. The output side or outlet of the second pump stage 49, that is the higher flow stage, is connected to a line or passageway 50, and the first pump stage 47 is connected with a line or passageway 52 to the line 50 at a junction 60. The junction 60 is on the opposite side of a relief valve line 54 and a check valve 56 from the output side or outlet of the second pump stage 49. The relief valve line 54 is connected to a bypass or relief valve 58 and the output of the relief valve 58 in connected to a line 61 that is the inlet line for the pump stages and is also open to the reservoir or tank.

Thus, from the junction 60 of the lines 50 and 52, the flow of hydraulic fluid under pressure will be carried on line 43 to the valve 42 leading to the motor 38 for the feed roller 36. The main system relief valve 48 is connected between the line 43 and the line 64 to the reservoir or tank.

The manually adjustable pressure compensated flow control valve 45 is shown schematically and includes a manually adjustable variable orifice 66 and a bypass valve 70, that will bypass hydraulic oil to the reservoir or tank, as a function of the differential pressure between the input and output sides of the manually adjustable orifice 66. By adjusting the orifice 66 the total flow to the valve 42 can be changed by the operator. This will let the operator adjust the flow to motor 38, and thus the speed of the feed roller 36 as desired, independent of the hydraulic pressure required by the feed roller motor 38.

The valve 42 is a reversing valve, and has a neutral position that permits flow back to the reservoir or tank. Again, it should be understood that the first pump stage 47 could be a separate pump, and the second pump stage could also be separate, and the separate pump stages could be plumbed exactly as shown except they would be individually driven. The term "pump stage" as used herein includes two pumps in a single pump housing, or separate pumps, to provide the different flows. There could be a plurality of more than two pump stages, each with different flows, that would be progressively bypassed across a range of pressures.

Operation

It can be seen that when the valve 42 is manually moved to one position, the feed roller drive motor 38 will rotate in a direction to rotate the feed roller 36 as shown by the arrow in FIG. 2. The feed roller feeds materials to the chipper rotor 22. Under normal conditions the flow in line 43 is a combination of the flows from the two pump stages 47 and 49, or in the example given, a maximum of six gallons per minute. The main relief valve 48 would be set at a high pressure such as 3000 psi, the bypass relief valve 58 which will bypass the flow from the second or higher volume pump stage can be set to open at a pressure in the range of 750 pounds per square inch on line 43, or by way of example ¼ of the high pressure relief valve setting. The pressure setting can be higher or lower to suit conditions.

As the feed roller 36 moves the wood 32 into the chipper rotor, the roller can be operating at a high speed, and if there is an increased load due to a large log or a jam of some type, the pressure required for rotating the feed roller by the motor 38 will increase. If it increases up to 750 psi (which is selected as the setting of relief valve 58) the valve 58 will open and will direct or bypass the output from one pump stage, as shown the higher flow pump stage 49 back to the line 61 to the inlet of both pump stages or to the tank, leaving the low flow, or in this example, two gallons per minute, present in line 62. The check valve 56 prevents backflow of the output of the first or low flow pump stage 47 to the line 54 and the relief valve 58, as can be seen. Also, if the loading on the feed roller motor is high from large material being fed so that the lower flow is provided for a time, and then a lighter load is encountered because small branches or material are fed, the drive will automatically speed up when the load on the feed roller motor 38 reduces and the additional flow from the pump stage originally bypassed is added. This feeds the smaller material fast and makes for efficient operation, and avoids any tendency for an operator to reduce the flow to the motor 38 and reduce the speed of the feed roller, manually by changing the conventional manually operated flow divider or bypass valve setting to accommodate the highest load encountered, and then not resetting the flow and speed for lighter loads. The system of this disclosure changes the speed of the feed roller automatically as a function of the load on the feed roller. While it is still provided, the feed roller manual speed adjustment, using a manual flow control, is not needed in many cases.

This automatic reduction in the flow to the motor 38 will result in a reduction in speed that is substantial, so that the chipper rotor 22 will not be overloaded, and the loading on the feed roller 36 will be reduced. When the pressure is reduced to a level below the 750 psi setting for valve 58, (to about 550 psi for example) relief valve 58 will then close and the full flow of both pump stages will be restored to the line 43 for the valve 42 and motor 38, for driving the feed roller 36 at a higher rpm. Conversely, the increase in speed from the low flow, when the feed roller is loaded down, to higher flow when the feed roller load reduces and the motor and feed roller speed up, is substantial.

Several different pump flows can be provided, so the flow to the motor can be changed in selected stages in response to pressure changes in the line to motor 38.

The concept of driving a feed roller for a chipper with pumps having two or more different or equal flows, is a step forward in alleviating overload feeding. The feed roller is restored to its higher speed for faster feeding when the feed roller is more lightly loaded.

The above example of a six gal/min flow is with the manually adjustable pressure compensated flow control valve 45 wide open. If the valve 45 is adjusted to reduce the flow of six gal/min to the motor 38 to, for example, a five gal/min flow, the feed roller would be operating at a reduced speed. If the pressure in line 43 then exceeds the 750 psi setting, the bypass valve 58 would open and the flow from the high flow pump stage 49 would be dumped, leaving the two gal/min flow from the pump stage 47 to drive the motor 38.

It is apparent that if the manually adjustable pressure compensated flow control valve 45 is adjusted so the flow to motor 38 is 2 gal/min or less, opening the bypass valve 58 would have no effect on the flow to the motor 38.

An auxiliary pressure switch shown at 74 can be used in the motor circuit, to provide a signal to stop the motor 38 and momentarily reverse the valve 42 to reverse the feed roller to clear a jam and then drive the motor 38 in forward again. This operation is conventionally done to try to clear jams of the feed roller 36. The pressure switch 74 is set to close at a pressure that is just slightly less than the main system relief valve pressure setting.

By sensing the pressure and immediately reducing the in-feed speed, before the feed roller and chipper rotor jam, and then increasing the speed automatically when the load on the feed roller reduces, the operation can be maintained at a better rate, Another advantage of slowing down the feed roller speed is to reduce the "pop up" of the end far end of a log when the "square cut" end is first put into the feed roller. This end pop-up is mostly a problem with short logs, and can be violent. When two pump stages are utilized, and the feed roller is operating at a high speed, the pressure surge caused by the square cut end going under the feed roller will cause the motor to shift down, and eliminate or greatly reduce any pop-up. The feed roller speed control of this disclosure works as a feed speed control at all horse power ranges up to the maximum or full engine power. It is a speed control for efficient operation by permitting an operator to maintain the full flow to the feed roller during operation because the flow to the feed roller motor will automatically reduce when the feed roller is loaded so the pressure to the motor raises above the selected pressure limit, but runs at full speed for all lighter loads. When the load on the drive engine is close to maximum power the reduction in flow to the feed roller will make more power available for chipping or shredding. If the engine still pulls down from the load, the conventional controls will stop the flow to the feed roller motor and in some conventional systems temporarily reverse the feed drive.

The system shown can be used when a lower flow pump stage is bypassed as the load increases on the feed roller, or as shown, the higher flow can be bypassed. The pump stages can also all be equal flow.

The term chipper includes machines that disintegrate, shred or chip materials such as wood, crop residue or trash with a powered feed and a powered disintegrator member, such as a rotor.

Although the present invention has been described with reference to preferred embodiments, workers skilled in the art will recognize that changes may be made in form and detail without departing from the spirit and scope of the invention.

What is claimed is:

1. A wood chipper having a disintegrating member, and a feed roller operable at different speeds for feeding material to be disintegrated into said disintegrating member, a hydraulic motor for driving the feed roller, and a pump assembly for providing hydraulic fluid under pressure to the hydraulic motor, the hydraulic motor normally increasing the speed of the feed roller as hydraulic fluid pressure supplied to the hydraulic motor is increased, the pressure of the hydraulic fluid required to operate the hydraulic motor increasing as loading on the feed roller is increased, said pump assembly including at least a first pump stage providing a first output flow, and a second pump stage providing a second output flow, the output flows provided by the first and second pump stages being added to each other, and a bypass valve connected to the output of the second flow pump stage, and opening when fluid pressure provided to the hydraulic motor is at a selected level due to loading on the feed roller to divert the output flow of the second pump stage from the added flow so as to thereby reduce the speed of the feed roller.

2. The wood chipper of claim 1 wherein the first and second pump stages are incorporated into a single pump body.

3. The wood chipper of claim 1 wherein the selected pressure level for opening the bypass valve is substantially lower than an overall hydraulic system pressure.

4. The wood chipper of claim 1 wherein the combined output of the first and second pump stages act through a reversing valve to drive said motor.

5. The wood chipper of claim 1 wherein an output connection receiving the second output flow of the second pump stage is connected to a flow line, a check valve in the flow line to prevent flow in the flow line back to the second pump stage, and a flow connection from the first pump stage to the flow line on an opposite side of the check valve from the connection of the bypass valve to the output of the second pump stage.

6. The wood chipper of claim 1 wherein one of the pump stages provides a different pump flow from the other pump stage.

7. The wood chipper of claim 1 wherein the second pump stage provides a higher flow rate than the first pump stage.

8. A wood chipper having a chipping rotor, and a feed roller operable at different speeds for feeding material into said chipping rotor, a hydraulic motor for driving the feed roller, and a pump assembly for providing hydraulic fluid under pressure to the hydraulic motor, the hydraulic motor normally increasing the speed of the feed roller as hydraulic fluid pressure supplied to the hydraulic motor is increased, the pressure of the hydraulic fluid required to operate the hydraulic motor increasing as loading on the feed roller is increased, said pump assembly including a plurality of pump stages each having a different flow output, the flow outputs provided by the plurality of pump stages being added to form a total flow, and a bypass valve connected to the output of at least one pump stage, the bypass valve opening when fluid pressure provided to the hydraulic motor is at a selected level due to loading on the feed roller to divert the output flow of the at least one pump stage from the total flow so as to thereby reduce the speed of the feed roller.

9. The wood chipper of claim 8 wherein the at least one pump stage provides a higher pump flow than at least one other pump stage.

10. The wood chipper of claim 9 wherein an output connection receiving the output flow of the at least one pump stage is connected to a flow line, a check valve in the flow line to prevent flow back from the at least one other pump stage, and a flow connection from the at least one other pump stage to the flow line on an opposite side of the check valve from the output connection of the at least one pump stage.

11. The wood chipper of claim 8 wherein the selected pressure level for opening the bypass valve is substantially lower than an overall hydraulic system pressure.

12. The wood chipper of claim 8 wherein the total flow is provided through a reversing valve to drive said motor.

13. A wood chipper having a disintegrating member, and a feed roller operable at different speeds for feeding material to be disintegrated into said disintegrating member, a hydraulic motor for driving the feed roller, and a pump assembly for providing hydraulic fluid under pressure to the hydraulic motor, the hydraulic motor normally increasing the speed of the feed roller as hydraulic fluid pressure supplied to the hydraulic motor is increased, the pressure of the hydraulic fluid required to operate the hydraulic motor increasing as loading on the feed roller is increased, said pump assembly including at least a first pump stage providing a first output flow, and a second pump stage providing a second output flow, the output flows provided by the first and second pump stages being added to each other so that the added output flows permit the hydraulic motor to operate the feed roller at a speed higher than could be achieved by either of the first and second output flows alone, and a bypass valve connected to the output of the second flow pump stage, and opening when fluid pressure provided to the hydraulic motor is at a selected level indicative of a predetermined heavy load on the feed roller to divert the output flow of the second pump stage from the added flow and thereby reduce the speed of the feed roller.

* * * * *